United States Patent [19]
Miller

[11] 3,877,744
[45] Apr. 15, 1975

[54] SERVING CART
[75] Inventor: Matthew N. Miller, Woodland Hills, Calif.
[73] Assignee: Fairchild Industries, Inc., Germantown, Md.
[22] Filed: Oct. 12, 1973
[21] Appl. No.: 405,804

[52] U.S. Cl. ............... 296/22; D12/28; 108/38; 186/1 R; 220/29; 280/47.35; 312/284
[51] Int. Cl. ............................................. B60p 3/02
[58] Field of Search ............ 186/1 R, 1 B, 1 C, 1 D; 244/118 P; 280/47.19, 47.35, 47.34; 296/22; 220/29; 312/244, 250, 284; 108/99, 38; D12/28, 33; D6/179

[56] References Cited
UNITED STATES PATENTS

| | | | |
|---|---|---|---|
| 1,948,937 | 2/1934 | DeMuth | 296/22 X |
| 2,490,588 | 12/1949 | Fric et al. | 296/22 |
| 2,520,543 | 8/1950 | Hawkins | 296/22 X |
| 3,567,063 | 3/1971 | Kovach | 220/29 |
| 3,655,088 | 4/1972 | Box | 220/29 |
| D188,315 | 7/1960 | Frick | 296/22 X |

Primary Examiner—Lloyd L. King
Assistant Examiner—Randolph A. Reese
Attorney, Agent, or Firm—Michael W. York

[57] ABSTRACT

A serving cart having a security cover to protect objects on the cart against unintended or unauthorized removal, the upper surface of which may be utilized as a table and which can be opened to provide additional shelf and work space at the end of the cart. The cover is provided with sides which limit access to articles located on the upper surfaces of the cart, as well as preventing such articles from sliding off when it is used as a shelf. The sides of the cover and shelf surface are configured so that the cover may be pivotally mounted on the cart in such a manner that the cart handles will remain accessible when the cover is situated in either of its operating positions, as well as enable the cover to be self-supporting when it is used as a shelf.

9 Claims, 4 Drawing Figures

PATENTED APR 15 1975 3,877,744
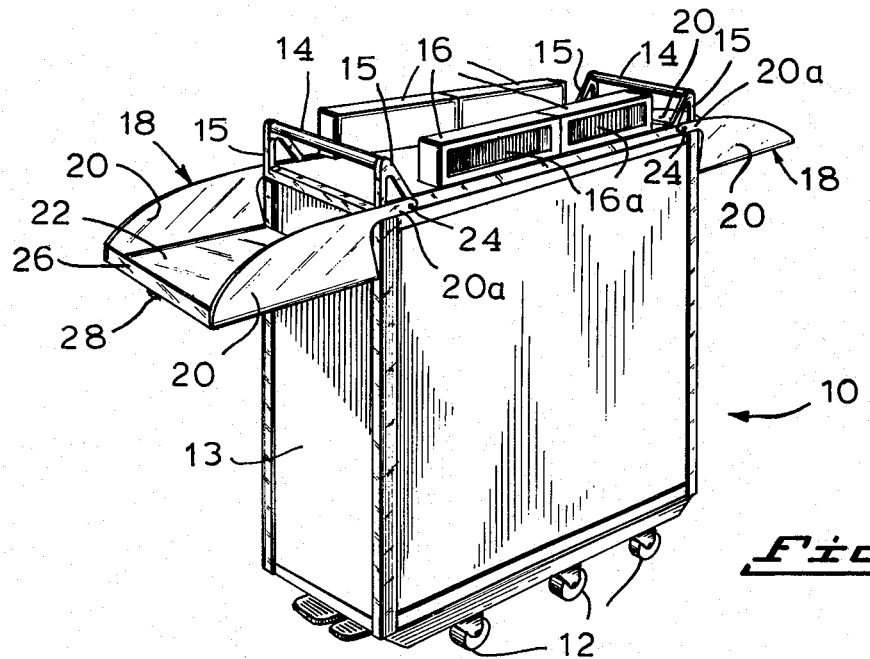
*Fig.1*
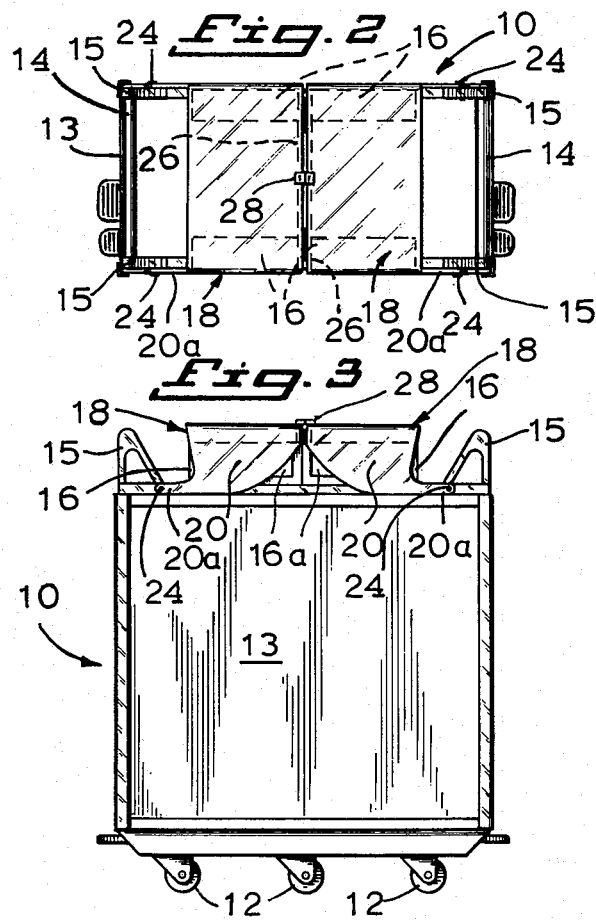
*Fig.2*
*Fig.3*
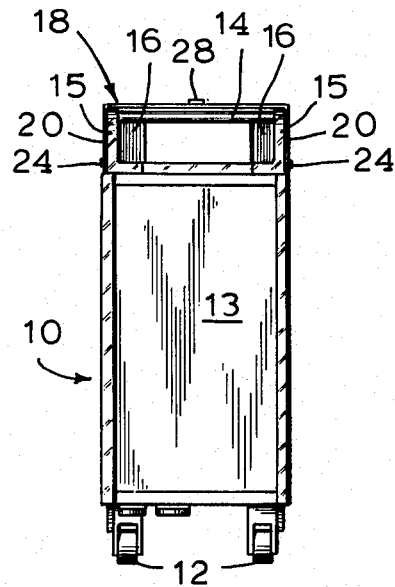
*Fig.4*

SERVING CART

REFERENCE TO RELATED APPLICATION

Reference is made to my copending U.S. Design Pat. application Ser. No. D 339135 now Pat. No. D 230141 which discloses and claims ornamental features of a possible embodiment of the invention.

BACKGROUND OF THE INVENTION

With the ever increasing popularity of large transport aircraft, added emphasis has been placed upon improving the quality of food and beverage service to the passengers on these aircraft. As a consequence, on these aircraft it is customary to serve substantial numbers of people located some distances from and, in some cases, at different levels from where the food and beverages may be prepared and/or stored. Accordingly, the use of mobile serving carts for this purpose has proven to be an invaluable aid in providing quick and efficient service to the large numbers of people that must be accommodated and for this reason their use has become virtually universal in aircraft and increasingly popular in other passenger vehicles, such as trains and the like.

However, with the proliferation of service cart use particularly in aircraft, certain disadvantages in the carts have become apparent. Among the problems associated with their use has been the substantial losses experiences as a result of pilferage of articles from the cart. Such pilferage has become even more evident on the so-called "jumbo" transport aircraft since the carts are frequently left unattended and from time to time may as well be dispersed at various locations in the passenger compartments while the attendant temporarily attends to other duties. In addition, there have been occasions when emergency situations have arisen during flight, which produces negative gravitational or g loads. Although most aircraft service carts in use are equipped with adequate braking and/or tethering arrangements to secure them in place under these conditions, the contents of the carts can be affected by these negative forces. In particular, those items such as beverage bottles, can, etc. that are normally left upon the upper surface of the cart, even when the carts are not in immediate use are, when subjected to these forces, prone to become dislodged and become dangerous missiles within the passenger compartment. As a consequence, there is a need for means for maintaining such items on the service cart under these conditions. Coincident with this need is a continuing desire for additional work or shelf space that would facilitate mixing individual beverages, and would permit the cabin attendants to render the quality of service that is most pleasing to the passengers. However, providing additional work space usually tends to make such carts cumbersome and unwieldy.

It is desirable to remedy these deficiencies and provide apparatus that will perform these functions, namely apparatus which can operate as a security cover to preserve the contents of the cart against pilferage, as well as prevent the dangerous condition and losses which might occur during emergency conditions, and provide additional shelf space without the attendant drawbacks of making the service cart too cumbersome or unwieldy for its convenient use within the confines of a vehicle passenger compartment.

Several types of cover and shelf arrangements have been disclosed in prior art patents and in particular in U.S. Design Pat. Nos. 182,926, 188,315, 190,414, as well as in U.S. Pat. No. 1,948,937. However, the cover and shelf arrangements disclosed in these patents do not permit the cart handles to be accessible when the covers are opened and as a consequence, their use in passenger vehicles and in particular in aircraft, is not practical. In this connection, it is essential that the handles on food and beverage service carts used on aircraft always be accessible to attendant personnel so that they may be grasped quickly in the event of sudden or unexpected changes in attitude which do occur from time to time during flight. Moreover, such service cart are often equipped with additional mechanisms and devices such as brake actuators, drive controls and the like, which are incorporated into the cart handle so that it is especially important not to impede the handles' accessibility at any time.

In addition, it is also desirable to provide sidewalls which can contain the comparitively tall articles which are likely to be placed upon the shelf surface. As an example, such items customarily include beverage cans, bottles, glasses and the like which are relatively tall. Accordingly, the sidewalls must be of a sufficient height to provide adequate protection to prevent these articles from sliding off the shelf, yet not present an undue obstacle to the convenient use of the shelf space. As a consequence, the prior art arrangements are not particularly suitable for use on aircraft since it is doubtful that they could contain such articles during the variations in acceleration and attitude normally occurring during flight. Furthermore, the cart structures disclosed in the previously noted prior art Patents in general rely on the cart structure, the cart handles, or external bracelike arrangements to support their respective shelves or table surfaces when they are open, and generally reduce the accessibility of the cart handles while tending to add to the weight and complexity of the serving cart.

The serving cart of this invention overcomes these deficiencies and provides a serving cart with a cover that can also be utilized as a self-supporting shelf and worktable surface without limiting the access to the service cart handles or unduly increasing the weight and complexity of the serving cart.

SUMMARY OF THE INVENTION

This invention relates to food and/or beverage serving carts of the type used in aircraft and other passenger vehicles and more particularly to serving carts which have a shelf for holding food and/or beverages.

Accordingly, it is a principal object of the present invention to provide an improved food and/or beverage serving cart which will enhance the quality and efficiency of food and beverage service to passengers aboard vehicles.

It is also an object of the present invention to provide a food and/or beverage serving cart which may be left unattended without risking pilferage of its contents by providing a security cover which can be operated to effectively prevent articles from being removed from the cart.

It is an additional object of the present invention to provide a serving cart cover to preserve the articles on the serving cart under negative gravity forces and which also forms a shelf from which food and/or beverages may be dispensed with ease and convenience.

It is a further object to provide a serving cart having additional shelf space without encumbering the mobility and maneuverability of the serving cart.

It is another object of the present invention to provide a serving cart that has a security cover which, when opened to provide a shelf, prevents articles placed thereon from sliding off the shelf and does not interfere with the normal dispensing of food and beverages.

It is yet another object of the present invention to provide a serving cart having a security cover that can be opened to provide a shelf which will be self-supporting when in such an open position, and be capable of supporting loads placed thereon without requiring additional structure for such support.

It is also an underlying object of the present invention to provide a serving cart having a security cover which provides a relatively smooth and contiguous uppermost surface on the cart.

The present invention provides a serving cart for dispensing food and beverages in passenger vehicles and includes a security cover positionable over the upper surface of the service cart to prevent the removal of articles therefrom and having surfaces usable as a table and as a shelf when in the closed and the open positions respectively. The covers may be pivotally mounted at each end of the service cart and be independently rotated to an open position so that they each may be utilized as a shelf and thereby provide an added work surface at either or both ends of the cart. Each cover is configured and mounted so that it is self-supporting and will permit the service cart handle to remain accessible when the cover is utilized in the open shelf position or the closed cover position.

BRIEF DESCRIPTION OF THE DRAWINGS

FIG. 1 is a perspective view of a serving cart of the present invention showing its covers in the open position for use as shelves.

FIG. 2 is a top plan view of the serving cart illustrated in FIG. 1 with its covers in the closed position.

FIG. 3 is a side elevation of the serving cart illustrated in FIG. 2.

FIG. 4 is an end view of the serving cart illustrated in FIG. 2.

DETAILED DESCRIPTION OF THE PREFERRED EMBODIMENTS

If reference is made to the drawings, it will be noted that a typical serving cart of the present invention for dispensing food and/or beverages to passengers aboard vehicles, has been generally designated by the numeral 10. The serving cart 10 is provided with a plurality of castored wheels 12 positioned along the base of the serving cart body 13 and adapted to permit the cart 10 to be rolled in any direction. Although most serving carts used in vehicles such as aircraft are provided with some type of braking and tethering mechanisms (not shown) for obvious safety reasons, some serving carts are even more sophisticated in that they may be equipped with propulsion arrangements (not shown) to propel more heavily loaded carts or to facilitate the movement of the carts over inclined surfaces, as is frequently the case in aircraft. Many carts equipped with these brake or propulsion devices usually have suitable controls conventionally disposed on or associated with the cart handles 14, which, in the case of the cart shown in the drawings, are situated at the upper portion of the forward end and the upper portion of the rearward end of the cart body 13 as viewed in FIg. 1, so that it can be pushed, steered, or otherwise controlled from either end. The handles 14 are disposed between supporting brackets 15 fastened at each side of the cart.

Serving carts are generally arranged so that the provisions which are to be dispensed from them are available from their upper surfaces to minimize the stooping and bending required of the server and thereby improve the speed and efficiency of the food and beverage service. Accordingly, some carts may have their upper surfaces modified or fashioned in some manner to better accommodate them for the particular type of service to be proferred. As an example, carts adapted to serve beverages, as that shown in the drawings, may have suitable accommodations for the containment of glasses, condiments and the like arranged on their upper surface while similarly, carts adapted for food service may have special accommodations for food trays arranged on their upper surface. However, since these specific accommodations are well known and obvious to those skilled in the art, these variations in detailed configuration are not illustrated in the drawings or further described herein. However, it can be appreciated that despite the particular cart configuration, the addition of a shelf space to provide an added work surface or table area is a universally desired feature, particularly when such added work space can be provided without the attendant disadvantage of making the cart more cumbersome or difficult to maneuver.

In serving carts that are adapted to be used in the serving of beverages such as that illustrated in the drawings and described herein, beverage containers such as tins, bottles and the like are usually stored in magazines or receptacles (not shown) that are usually disposed in banks near the sidewalls of the service cart. These receptacles may be tubular structures situated vertically and open at the top of the service cart. The beverage containers, tins, bottles, etc., are stored within these receptacles in which they are stacked one upon the other and fed upwardly toward an opening in the upper region or surface of the cart (not shown) by any variety of well known spring or similarly acting devices (not shown) associated with the receptacles or magazines. In actual practice, it is customary for each individual beverage magazine to contain the same type of beverage so that the attendant might quickly obtain whatever particular beverage he or she is called upon to dispense.

In beverage carts, each bank of magazine openings on the upper surface of the service cart 10 is equipped with retaining covers 16 which are rectangular box-like partial enclosures secured to the upper surface of the serving cart by any well known means (not shown) or in some instances made integrally with the upper portion of the cart structure. These retaining covers 16 are identical to one another and operate to retain the uppermost beverage containers as they are urged upwardly in their respective magazines by the spring or other means to contact the inner wall surfaces of the receptacle retaining covers associated with the particular receptacles.

Each of the retaining covers 16 is provided with a rectangular shaped access opening 16a disposed along the outward side of the cover and accessible from the side of the cart 10 so that the beverage containers may be removed therefrom while the succeeding beverage container will be retained in the place of the one removed by contact with the inner surface of the retaining cover. Other beverage service articles such as glasses, ice, condiments and the like may be conveniently carried on the upper surface of the cart 10 between the retaining covers 16 situated on each side of the serving cart.

To prevent articles from being hurled from the surface of the cart and to restrict access to these articles and thereby prevent their unauthorized removal, a pair of security covers 18 are provided. These covers are also operable to provide additional shelf space on both ends of the serving cart, as can best be seen in FIG. 1. In the present embodiment, each of these covers is adapted to cover approximately half of the upper surface of the cart 10, providing added flexibility and security and permitting the cart to be attended from one end if desired, whereupon one cover may be opened and used as a shelf while the other remains in the closed position. Each of the security covers 18 are substantially identical in configuration and comprised of a pair of spaced perpendicular side members 20 that are coincident with the sides of the upper surface of the cart 10 and a horizontal portion or shelf member 22 disposed between and connecting the perpendicular side members. This shelf member 22 is adapted to cover the upper surface of the serving cart when the security cover is in the closed position, as shown in FIGS. 2 and 3, and when in this position its uppermost surface also provides a convenient flat table like work surface.

The perpendicular side members 20 of each of the security covers 18 are each equipped with the projections 20a, which extend from the upper inward portion of each side member as viewed in FIG. 1 and are elevated somewhat above the plane of the shelf member 22. Each projection is adapted to accommodate a pivot pin 24 at its outer end, which is journaled therein as well as in the upper region of the serving cart body 13. Thus each cover is equipped with a pair of spaced projections which facilitate its pivotal connection to the serving cart and will permit the security covers to be rotated individually to the positions illustrated in FIG. 1, where they may function as shelves and thereby substantially increase the work surface area available on the serving cart 10. In addition, it will be evident that because the pivot locations of the covers 18 are located inwardly of the serving cart handles 14, the handles will remain unobstructed by the security covers 18 regardless of their position. As a consequence, the handles are readily accessible for practically all of the time and may be quickly grasped in the event of any abrupt vehicle attitude change or during any sudden emergency that might arise. Furthermore, by means of the cover configuration wherein the spaced projections 20a facilitate the pivot mounting of their respective covers 18 at this location on the cart 10, and the horizontal surfaces of the shelf members 22 on each of the covers 18 to be located at a different level, the security cover when closed will provide an effective shield for the service cart's upper surface. It will also be noted that accessibility to the beverage containers that are situated within the retaining covers 16 will be restricted because the perpendicular side members 20 effectively cover a substantial portion of the adjacent access openings 16a of the respective retaining cover 16. This structural arrangement also enables the covers to be self-supporting and capable of supporting objects of considerable weight when they are opened and being utilized as a shelf, as shown in FIG. 1. Loads that may be placed upon the respective shelf members 22 will be supported in a cantilever fashion. Such loads will be transmitted to the cart by means of the operative relationship of the sidemember projection 20a, pivot pins 24 and the cart, and the edge of the respective shelf member 22 and perpendicular side members 20 where they join, which bear against the adjacent vertical end of the cart body 13.

It will also be noted in FIG. 1 of the drawings that the perpendicular side members 20 of each of the covers gradually decrease in height above the shelf member 22 in the direction furthermost from their respective projections 20a, thereby affording better accessibility to the shelf member 22 while still providing a substantial measure of protection against possible upset of relatively tall articles such as glasses, bottles and the like, that would be likely to be placed upon the shelf. Moreover, this added protection is provided without prejudice to the ability of the cover side members 20 when in the closed position to shield articles within the retaining covers 11 on the cart.

In addition, note should be taken of the provision of a vertical ledge 26 which extends between the perpendicular side members 20 of each cover. This ledge 26 may be conveniently provided by an upturned end of the horizontal shelf member 22 to prevent articles from sliding off the horizontal surface of the shelf member 22, as well as serving to support the end of the security cover above the cart when it is closed. In this connection, it will be noted that when in the closed position, as best seen in FIG. 3, the edge of the ledge 26 is in contact with the upper surfaces of the retaining covers 16 and assures the alignment of the covers so that they form a contiguous surface when the covers are closed. This relatively smooth upper surface provides added utility to the cart by facilitating its temporary use as a table, when the cart is not used for serving.

A locking device generally designated 28, of any suitable variety and well known configuration, may be positioned on the security covers while a suitable key or similar means (not shown) will enable the locking device to be opened to permit one or both covers to be opened by authorized personnel that are provided with a key or similar means for this purpose.

In operation, the serving cart of the present invention has added utility in that the security covers 18, when in the closed position as seen in FIGS. 2, 3 and 4 not only operate to safeguard articles located on the upper surface of the serving cart, but as heretofore mentioned, also make available a substantially flat or horizontal table-like surface that is useful in a variety of ways. Moreover, the serving cart handles 14 remain completely accessible so that the serving cart can be readily grasped at all times and moved about the vehicle so that the table-like surface afforded by the closed covers may be used wherever it may be needed with relative ease and convenience.

When it is desired to serve from the cart, the cart attendant may utilize suitable means, such a key or the like, to unlock the locking device 28 which secures the covers 18 in the closed position. Each of the covers may then be conveniently grasped at or near the locking device, lifted and rotated so that they pivot outwardly about their respective pivot pins 24 to the open shelf position illusted in FIG. 1. It should be understood, however, that in the preferred embodiment disclosed herein, each of the cover 18 are independent of the other in that one may be opened to the shelf position at one end of the cart, while the other remains in the closed position. This might be preferable if the attendant desires to work from one end of the cart (that at which the cover would be opened to the shelf position) while maintaining security at the remote end of the cart that would obviously be more difficult for the attendant to keep under surveillance while he or she is otherwise occupied. When used in this mode, there is also an underlying advantage in having the upper table-like horizontal surface of the closed cover available for use so that half of the serving cart is useful as a table while the other might be used for serving. Use of the serving cart of the present invention in this fashion is particularly appropriate in those vehicles in which beverages are sold directly from the cart, when one attendant might use the table portion to hold a cash box and take orders, etc., while another serves from the other end of the cart.

When the cover or covers 18 are in the open shelf position, the shelf member 22 of each cover is substantially horizontal and disposed at a level that is lower than the upper surface of the serving cart body 13. As a consequence, one end of the shelf is bounded by the adjacent end wall of the serving cart body 13 while the remaining sides are bounded by the perpendicular side members 20 and ledge 26 so that articles such as glasses, bottles, ice containers and the like can be placed upon the shelf with relative safety against tipping or sliding from the shelf member 22. Moreover, since each of the cover members 20 decrease in height in the direction away from the cart when the covers are in the open shelf position, such articles may be placed upon or retrieved from the shelf member 22 with ease and convenience. Since the cart handles 14 are unencumbered by the covers 18 even when they are opened to the shelf position, the cart may be moved by the cart attendant without disturbing the articles left on the shelf so that serving from the cart to consecutive rows of passengers may be accomplished quickly and conveniently.

In addition, because the covers are capable of providing added shelf space at each end of the serving cart in the preferred embodiment, it is extremely practical and efficient for serving from the cart to be rendered by more than one attendant without the actions of one interfering with another. In such situations, the cart attendants may each operate from one end of the serving cart to render service from the cart even more efficiently than has been heretofore possible.

When serving from the cart has been completed, any articles remaining on the shelf or shelves may be removed and the security covers returned to the closed position by lifting them and rotating them about their respective pivots, until the ledge 26 disposed between the vertical side members 20 of each of the covers 18 comes to rest upon the upper surfaces of the retaining covers 16 on the cart. This will restore the covers 18 to their closed position. The locking device 28 may be reengaged to lock the covers in the closed position in which they will again provide a substantially horizontal and contiguous table surface at the top of the serving cart while enclosing and safeguarding any articles remaining on the serving cart.

Although the invention has heretofore been described with reference to a specific arrangement for the purpose of illustrating a manner in which the invention may be used to advantage, it will be appreicated that the invention is not limited thereto, and that variations and modification may be made within the spirit and scope of the invention as defined in the appended claims.

What is claimed is:

1. A serving cart for carrying and dispensing provisions to passengers in a vehicle comprising a serving cart body, a handle connected to the upper portion of one end of said cart body, and a cover pivotally connected to the upper portion of the same end of said cart body and adapted to be positioned over at least a portion of said cart body, said cover having means for forming a shelf when in its open position and having means for allowing access to said handle when the cover is in both its open and closed positions.

2. The serving cart of claim 1 further comprising a second handle connected to the upper portion of the opposite end of said cart body, and a second cover pivotally connected to the upper portion of the same opposite end of said cart body and adapted to be positioned over at least a portion of the upper surface of said cart body, said second cover having means for forming a shelf when in its open position and having means for allowing access to said second handle when the second cover is in both its open and closed positions.

3. The serving cart of claim 1 wherein said cover has projections which are pivotally connected to the upper portion of said serving cart body at a point located inwardly of said handle.

4. The serving cart of claim 3 wherein said cover has a shelf surface located at a level below the upper surface of said cart body when said cover is located in its open position.

5. The serving cart of claim 8 further comprising beverage dispensing means located along at least a portion of one upper side of said cart body and wherein said cover has means for at least partially covering said beverage dispensing means when said cover is in its closed position.

6. The serving cart of claim 5 wherein said cover has means for resting upon said beverage dispensing means when said cover is in its closed position.

7. The serving cart of claim 1 wherein said cover has means for permitting it to be self supporting when located in its open position.

8. The serving cart of claim 1 wherein a portion of the end wall of said serving cart body is located adjacent to one end of said cover when said cover is in its open position.

9. The serving cart of claim 1 wherein said cover comprises a pair of spaced side members and a shelf member located therebetween, said side members each having a projection pivotally connected to said cart body, said projections being spaced to be located beyond the ends of said handle.

* * * * *